(12) United States Patent
Kim et al.

(10) Patent No.: US 10,497,963 B2
(45) Date of Patent: Dec. 3, 2019

(54) FLEXIBLE SECONDARY BATTERY AND METHOD FOR MANUFACTURING SAME

(71) Applicant: JENAX INC., Busan (KR)

(72) Inventors: Chang Hyeon Kim, Chungcheongnam-do (KR); Eun Jung Shin, Gyeonggi-do (KR); Lee Hyun Shin, Busan (KR)

(73) Assignee: Jenax, Inc., Busan (KR)

( * ) Notice: Subject to any disclaimer, the term of this patent is extended or adjusted under 35 U.S.C. 154(b) by 101 days.

(21) Appl. No.: 15/507,298

(22) PCT Filed: Jul. 22, 2015

(86) PCT No.: PCT/KR2015/007596
§ 371 (c)(1),
(2) Date: Feb. 28, 2017

(87) PCT Pub. No.: WO2016/032126
PCT Pub. Date: Mar. 3, 2016

(65) Prior Publication Data
US 2017/0288255 A1   Oct. 5, 2017

(30) Foreign Application Priority Data
Aug. 30, 2014   (KR) .................. 10-2014-0114669

(51) Int. Cl.
| | | |
|---|---|---|
| H01M 10/04 | (2006.01) | |
| H01M 10/052 | (2010.01) | |
| H01M 10/0585 | (2010.01) | |
| H01M 10/058 | (2010.01) | |
| H01M 4/66 | (2006.01) | |

(Continued)

(52) U.S. Cl.
CPC ........... H01M 10/04 (2013.01); H01M 4/139 (2013.01); H01M 4/622 (2013.01); H01M 4/66 (2013.01); H01M 4/661 (2013.01); H01M 4/70 (2013.01); H01M 4/806 (2013.01); H01M 10/052 (2013.01); H01M 10/058 (2013.01);
(Continued)

(58) Field of Classification Search
None
See application file for complete search history.

(56) References Cited

U.S. PATENT DOCUMENTS

| | | | |
|---|---|---|---|
| 5,688,293 A | | 11/1997 | Oliver et al. |
| 2004/0197662 A1* | | 10/2004 | Maruyama ................ C08F 8/14 |
| | | | 429/303 |

FOREIGN PATENT DOCUMENTS

| | | |
|---|---|---|
| JP | 11-354159 | 12/1999 |
| JP | 11354159 A   * | 12/1999 |

(Continued)

OTHER PUBLICATIONS

International Search Report dated Oct. 6, 2015 for PCT/KR2015/007596.

*Primary Examiner* — Daniel S Gatewood
(74) *Attorney, Agent, or Firm* — Jones Day

(57) ABSTRACT

Provided are a flexible secondary battery and a method of manufacturing the same. The method includes forming an electrode including a metal fiber-like current collector and an active material combined with the metal fiber-like current collector; and providing a liquid pre-electrolyte that may be either thermally polymerized or crosslinked to the electrode and applying heat thereto, such that the liquid pre-electrolyte is integrated with the electrode and forms a gelated or solidified polymer electrode.

18 Claims, 4 Drawing Sheets

(51) Int. Cl.
  *H01M 4/70*     (2006.01)
  *H01M 4/139*    (2010.01)
  *H01M 4/62*     (2006.01)
  *H01M 4/80*     (2006.01)
  *H01M 10/0587*  (2010.01)
  *H01M 10/0565*  (2010.01)

(52) U.S. Cl.
  CPC .... *H01M 10/0565* (2013.01); *H01M 10/0587* (2013.01); *H01M 2300/0085* (2013.01)

(56) References Cited

FOREIGN PATENT DOCUMENTS

| KR | 10-2013-0133624 | | 12/2013 | |
|---|---|---|---|---|
| KR | 20130133624 A | * | 12/2013 | ............ H01M 4/661 |

* cited by examiner

FLEXIBLE SECONDARY BATTERY AND METHOD FOR MANUFACTURING SAME

This application claims the priority of Korean Patent Application No. 10-2014-0114669, filed on Aug. 30, 2014 in the KIPO (Korean Intellectual Property Office), the disclosure of which is incorporated herein entirely by reference. Further, this application is the National Stage application of International Application No. PCT/KR2015/007596, filed Jul. 22, 2015, which designates the United States and was published in Korean. Each of these applications is hereby incorporated by reference in their entirety into the present application.

TECHNICAL FIELD

The present invention relates to a secondary battery and a method of manufacturing the same, and more particularly, to a flexible secondary battery and a method of manufacturing the same.

BACKGROUND ART

Generally, a secondary battery includes a positive electrode including a positive electrode active material and a positive electrode current collector, a negative electrode including a negative electrode active material and a negative electrode current collector, and a separator interposed between the positive electrode and the negative electrode, where a electrolyte solution is impregnated into the negative electrode, the positive electrode, and the separator and functions as an ion passage. A lithium secondary batteries, which has recently been popular as a small-sized or medium and large-sized power source, uses an organic electrolyte solution as an electrolyte solution. The organic electrolyte solution exhibits a high electromotive force, which is twice or more times higher than that of a conventional battery using an aqueous alkaline solution. As a result, a lithium secondary battery exhibits a high-energy density.

However, as the stability of an organic electrolyte in the lithium secondary battery has been recently questioned, a solid electrolyte for replacing an organic electrolytic solution is being highlighted. In order for the solid electrolyte to exhibit electrical insulation and high ion conductivity, uniform gelation or solidification of an electrolyte during manufacturing process of a secondary battery and wettability between the electrolyte and an active material are important.

The gelation or solidification of the electrolyte is usually performed through a high temperature heat treatment. In this case, a polymer electrolyte may be easily deteriorated due to a high temperature. When a low temperature process is performed to suppress deterioration, the overall process time increases as well as an electrolyte is not uniformly gelated or solidified. Furthermore, when an electrolyte is not uniformly gelated or solidified, the wettability between the electrolyte and an active material is poor, and thus capacity of a battery is lowered.

DISCLOSURE OF THE INVENTION

Technical Problem

The present invention provides a secondary battery in which a gelated or solidified electrolyte may be uniformly and quickly formed throughout an electrode even through a thermal process at a low temperature and a method of manufacturing the secondary battery.

The present invention also provides a flexible secondary battery with improved lifespan due to integration of a polymer electrode with current collectors and a method of manufacturing the secondary battery.

Technical Solution

According to an aspect of the present invention, there is provided a method of manufacturing a secondary battery, the method including forming an electrode including a metal fiber-like current collector and an active material combined with the metal fiber-like current collector; and providing a liquid pre-electrolyte that may be either thermally polymerized or crosslinked to the electrode and applying heat thereto, such that the liquid pre-electrolyte is integrated with the electrode and forms a gelated or solidified polymer electrode.

The liquid pre-electrolyte may include an electrolyte salt, an electrolyte solvent, a crosslinkable monomer, and a thermal initiator that gelates or solidifies the monomer via at least one of crosslinking and polymerization by using heat. The crosslinkable monomer may include a monomer having two or more functional groups or a mixture of a monomer having two or more functional groups and a polar monomer having one functional group.

According to some embodiments, the monomer having two or more functional groups may include any one selected from the group consisting of trimethylolpropane ethoxylate triacrylate, polyethylene glycol dimethacrylate, polyethyleneglycol diacrylate, divinylbenzene, polyester dimethacrylate, divinylether, trimethylolpropane, trimethylolpropane trimethacrylate, and ethoxylated bisphenol A dimethacrylate, or a mixture of two or more thereof. The polar monomer having one functional group may include any one selected from the group consisting of methylmethacrylate, ethylmethacrylate, butylmethacrylate, methylacrylate, butylacrylate, ethylene glycol methylether acrylate, ethylene glycol methylether methacrylate, acrylonitrile, vinylacetate, vinylchloride, and vinylfluoride, or a mixture of two or more thereof. Furthermore, the electrolyte solvent may include cyclic or acyclic amides, amides like acetamides, esters, linear carbonates, cyclic carbonates, or a mixture thereof.

According to some embodiments, the thermal initiator may include benzoyl peroxide, acetylperoxide, dilauryl peroxide, di-tert-butyl peroxide, t-butyl peroxy-2-ethylhexanoate, cumyl hydroperoxide, hydrogen peroxide, 2,2'-azobis(2-cyanobutane), 2,2'-azobis(methylbutyronitrile) AIBN(2,2'-Azobis(iso-butyronitrile)), or AMVN (2,2'-Azobisdimethyl-Valeronitrile). The gelating or solidifying may be performed at a temperature of from 30° C. to 100° C.

The gelating or solidifying may be performed by providing the liquid pre-electrolyte before the electrode is put into a casing. The gelating or solidifying may also be performed by providing the liquid pre-electrolyte after the electrode is put into a casing. According to another embodiment, the electrode is either a positive electrode or a negative electrode, and the positive electrode and the negative electrode are put into the casing after a separator is interposed between the positive electrode and the negative electrode. The active material and the liquid pre-electrolyte are mixed with each other and impregnated into the metal fiber-like current collector.

According to an aspect of the present invention, there is provided a secondary battery including a positive electrode and a negative electrode, wherein at least one of the positive electrode and the negative electrode includes an electrode assembly including a mixture of a metal fiber-like current collector and an active material; and a gelated or solidified polymer electrolyte integrated with the interior of the metal fiber-like current collector. The polymer electrolyte may be integrated with both the positive electrode and the negative electrode.

The polymer electrolyte may include a matrix formed as a monomer having two or more functional groups or a mixture of a monomer having two or more functional groups and a polar monomer having one functional group polymerized via at least one of crosslinking or polymerization, an electrolyte salt, and an electrolyte solvent. Since at least a portion of the polymer electrolyte surrounds surfaces of a corresponding electrode, a separator may be omitted between the positive electrode and the negative electrode. The metal fiber-like current collector may have a non-woven fabric-like structure.

According to an embodiment of the present invention, after a liquid pre-electrolyte made of a polymer, an electrolyte solvent, a crosslinkable monomer, and a lithium salt is provided on an electrode including a mixture of metal fiber-like current collectors, which constitute a conductive network, and an active material, a high temperature operation is performed. At this time, the metal fiber-like current collectors function as a heat conduction path. Therefore, a method of manufacturing a secondary battery including electrodes having a polymer electrolyte obtained as the liquid pre-electrolyte is rapidly and uniformly gelated or solidified throughout the electrodes may be provided.

According to an embodiment of the present invention, a liquid pre-electrolyte provided through pores of metal fiber-like current collectors having a network structure forms a gelated or solidified polymer electrolyte integrated with the metal fiber-like current collectors, thereby not only securing excellent wettability between the metal fiber-like current collectors and the electrolyte to reduce the internal resistance of electrodes, but also improving adherence between the network structure and the electrode and binding force of the metal fiber-like current collectors with respect to an active material. As a result, a flexibly secondary battery that may be manufactured and deformed to a desired shape may be provided.

MODE FOR CARRYING OUT THE INVENTION

Figure 1A:
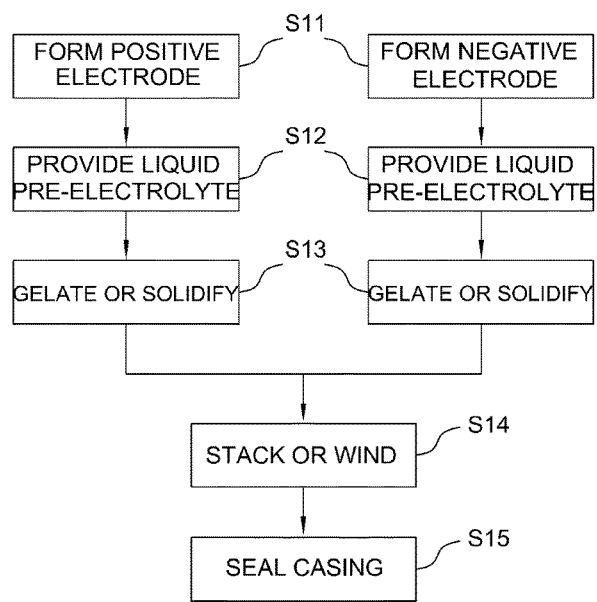
FIGS. 1A and 1B are a flowchart and a schematic view showing a method of manufacturing a secondary battery according to an embodiment of the present invention.

Hereinafter, exemplary embodiments will be described in detail with reference to accompanying drawings.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Also, in the drawings, thickness and size of each layer are exaggerated for convenience and clarity of explanation, and like reference numerals denote like elements in the drawings. As used herein, the term "and/or" includes any and all combinations of any of listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

Although the terms "first" and "second" are used herein to describe various elements, components, regions, layers, and/or sections, these elements, components, regions, layers, and/or sections shall not be limited by these terms. These terms are only used to distinguish one element, component, region, layer, or section from another region, layer, or section. Thus, the first element, component, region, layer, or section below may refer to a second element, component, region, layer, or section without departing from the teachings of the present invention.

A metal fiber used in the present specification is a fiber body of a metal, such as a stainless steel, aluminum, nickel, titanium, copper, or an alloy thereof, and is a metal body continuously grown with a substantially uniform thickness substantially within a range of entire lengths of about 1 μm and more than 1 μm. The metal fiber exhibits excellent heat conductivity and has unique advantages of fibers that may be processed as a woven fabric or a non-woven fabric and properties of a metal including heat resistance, plasticity, and electric conductivity simultaneously.

The metal fibers may be fabricated by maintaining a metal or an alloy in a molten state in a container and spraying the melt into the atmosphere through a spray hole of the container by using a pressurizing device such as a compressed gas or a piston and quenching and solidifying the sprayed melt. Alternatively, the metal fibers may be fabricated by using a bundle drawing technique known in the art. By controlling the number and size of the spray holes and/or emergence of the sprayed molten metal, thickness, uniformity, texture (e.g., a nonwoven fabric-like texture), and aspect ratio of the metal fibers may be controlled. The metal fibers constituting a battery according to the present invention may be fabricated not only by using the above-described fabrication technique, but also by using other fabrication techniques known in the art, and the present invention is not limited thereto.

Figure 1B:
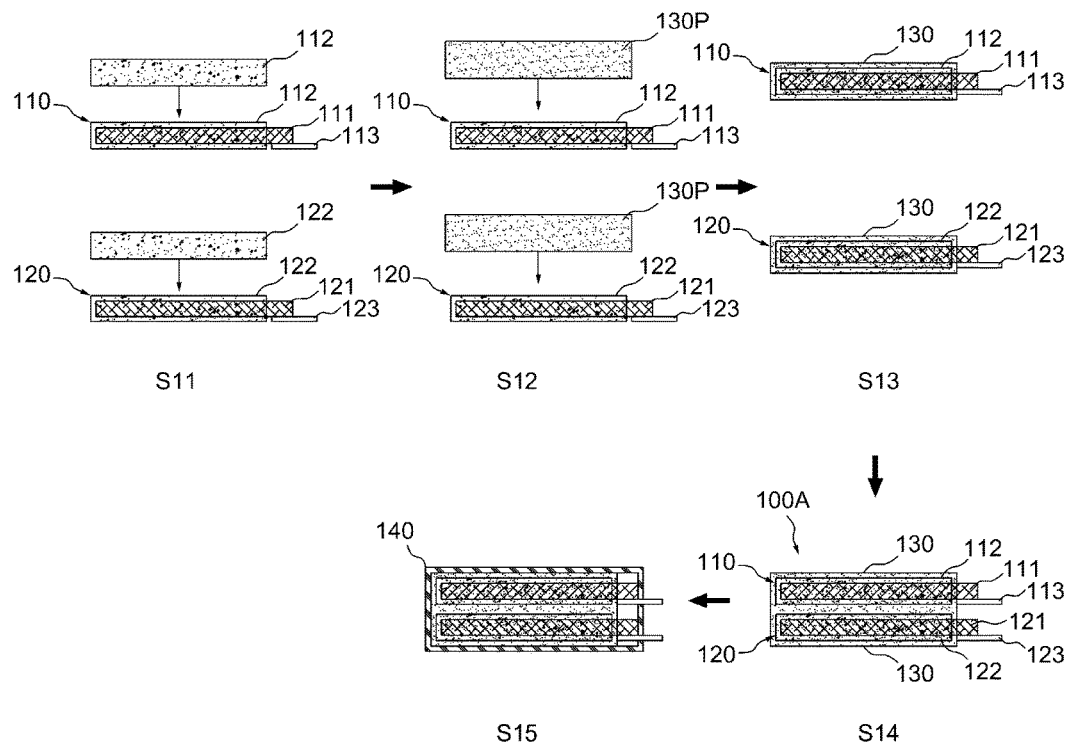

FIGS. 1A and 1B are a flowchart and a schematic view showing a method of manufacturing a secondary battery according to an embodiment of the present invention.

As shown in FIGS. 1A and 1B, a method of manufacturing a secondary battery according to an embodiment includes providing an electrode (operation S11), providing a liquid pre-electrolyte (operation S12), gelating or solidifying of the pre-liquid electrode (operation S13), stacking or winding (operation S14), and sealing a casing (operation S15). A positive electrode (or a cathode) 110 and a negative electrode (or an anode) 120 fabricated in the electrode forming operation S11 include metal fiber-like current collectors 111 and 121 which include a plurality of metal fibers contacting one another and constitute a conductive network and a heat conduction network. As used herein, the term 'liquid pre-electrolyte' refers to a liquid raw material containing a precursor for forming a gelated and solidified electrolyte.

The metal fiber-like current collectors 111 and 121 are mechanically connected to each other as a plurality of metal fibers are randomly arranged, physically contact one another, and are tangled with one another by being bent or curved, thereby constituting a single conductive network including porosities. The conductive network may constitute a nonwoven structure. The plurality of metal fibers may include two or more different kinds of metals or metals with different lengths as needed.

Unlike a conventional metal foil-like current collector, the metal fiber-like current collectors 111 and 121 may be used as a single active electrode because the both main surfaces communicate with each other. Therefore, when the metal fiber-like current collectors 111 and 121 constitute an electrode, energy density thereof may be further increased as compared to a metal foil-like current collector in which both main surfaces respectively constitute separate active electrodes.

Each of the metal fiber-like current collectors 111 and 121 may have a thickness within a range from 1 μm to 200 μm. When the thickness of any of the metal fiber-like current collectors 111 and 121 is less than 1 μm, it is not only difficult to form metal fibers having uniform thickness and strength, but also difficult to artificially arrange the metal fibers to form the above-stated heat conduction network. When the thickness of any of the metal fiber-like current collectors 111 and 121 exceeds 200 μm, the surface area per volume of the metal fiber is decreased, and thus it is difficult to obtain battery performance improvement due to increased surface area. Furthermore, since active materials 112 and 122 are weakly restrained, the active materials 112 and 122 are separated from the electrodes 110 and 120 during use. As a result, irreversible capacity of a battery increases as the battery is used, and thus the lifetime of the battery may be deteriorated.

The metal fiber-like current collectors 111 and 121 may include any one of stainless steel, aluminum, nickel, titanium, copper, an alloy thereof, or a combination thereof. For example, in case of the positive electrode 110, the metal fiber-like current collector 111 may be made of aluminum or an alloy thereof that is not oxidized in a high potential region. In case of the negative electrode 120, the metal fiber-like current collector 121 may be made of copper, stainless steel, nickel or alloys thereof, which are electrochemically inactive at low operating potentials.

According to some embodiments, a plate-like metal foil (not shown) may be further attached to first surfaces of the metal fiber-like current collectors 111 and 121. The metal fiber-like current collectors 111 and 121 and the metal foil may be thermally welded to each other, ultrasonic welded to each other, or attached to each other via an adhesive. Although the above-stated embodiment relates to a case where both the positive electrode 110 and the negative electrode 120 include the structures of the metal fiber-like current collectors 111 and 121, respectively. However, it is merely an example, and only any one of the positive electrode 110 and the negative electrode 120 may have the structure of the metal fiber-like current collector.

The electrodes 110 and 120 may be provided by impregnating the active materials 112 and 122 into the metal fiber-like current collectors 111 and 121 or coating the active material on the metal fibers of the metal fiber-like current collectors 111 and 121. FIG. 1B shows a case where the active materials 112 and 122 are impregnated in the metal fiber-like current collectors 111 and 121. The active material 110 and 120 may be mixed with a binder and a suitable solvent, impregnated in a slurry form, and dried.

The active material 112 of the positive electrode 110 may be a ternary or higher-order compound including at least two of cobalt, copper, nickel, manganese, titanium, and molybdenum and including at least one non-metal atom selected from a group consisting of O, F, S, P, and combinations thereof, e.g., Li[Ni, Mn, Co]$O_2$. However, types of the cathode active materials are not limited thereto, and other active materials known in the art may be used.

The active material 122 of the negative electrode 120 may be a carbon-based material, such as low-crystalline carbon or high-crystalline carbon. The low-crystalline carbon may be, for example, soft carbon or hard carbon. The high-crystalline carbon may be a high-temperature plastic carbon, e.g., natural graphite, Kish graphite, pyrolytic carbon, mesophase pitch based carbon fiber, meso-carbon microbeads, mesophase pitches, petroleum, or coal tar pitch derived cokes. However, types of the negative electrode active material are not limited in the present invention. For example, any active material (e.g., silicon, tin, etc.) that may be highly-capacitized and alloyed with, intercalated to, or deintercalated from lithium may be used.

In the liquid pre-electrolyte providing operation S12, the liquid pre-electrolyte 130P refers to a liquid-electrolyte precursor before formation of a gel electrolyte or a solid electrolyte. The liquid pre-electrolyte 130P includes an electrolyte salt, an electrolyte solvent, a crosslinkable monomer, and a thermal initiator for crosslinking and/or polymerizing the monomer. According to some embodiments, the liquid pre-electrolyte 130P may further include a non-crosslinked polymer for viscosity and elasticity control. For example, the non-crosslinking polymer may be a single compound or two or more mixtures selected from linear polymers, such as polyethylene oxide, polyvinylidenefluoride-co-hexafluoropropylene or polyacrylonitrile, polymethyl methacrylate, and polyvinyl chololide; and branched polymers, such as poly[methoxypolyethylene glycol methacrylate] and a poly[2-methoxy ethyl glycidyl ether].

As described above, the liquid pre-electrolyte 130P may be applied after the active materials 112 and 122 are impregnated in the metal fiber-like current collectors 111 and 121. For example, the liquid pre-electrolyte 130P may be injected to or coated on one surface or the entire surfaces of the electrodes 110 and 120 prepared according to the above-described method. In another example, the electrodes 110 and 120 may be dipped in a bath filled with the liquid pre-electrolyte 130P, thereby introducing the liquid pre-electrolyte 130P into the metal fiber-like current collectors 111 and 121 through pores in the metal fiber-like current collectors 111 and 121.

According to another embodiment, although not shown, the slurry of the above-described active material and the liquid pre-electrolyte 130P may be impregnated together into the metal fiber-like current collectors 111 and 121 in the form of a mixed slurry. The mixed slurry may be impregnated by accommodating the mixed slurry in a bath and passing the metal fiber-like current collectors 111 and 121 through the bath. Alternatively, the mixed slurry may be impregnated by applying the mixed slurry on the metal fiber-like current collectors 111 and 121 and coating the interior of the metal fiber-like current collectors 111 and 121 with the mixed slurry by using a doctor blade or a roller.

The liquid pre-electrolyte 130P is an electrolyte salt and may include any one, two, or more of lithium salts including $LiCl$, $LiBr$, $LiI$, $LiPF_6$, $LiClO_4$, $LiBF_4$, $LiCF_3SO_3$, $LiAsF_6$, $LiSbF_6$, $LiAlCl_4$, $LiB_{10}Cl_{10}$, $LiCF_3CO_2$, $CH_3SO_3Li$, $CF_3SO_3Li$, $LiN(CF_3SO_2)_2$, $LiC(CF_3SO_2)_3$, $LiC_4BO_8$, $(CF_3SO_2)2NLi$, or a mixture of two or more thereof. These materials are merely examples, and the present invention is not limited thereto. For example, the lithium salt may be lithium acetate-citrate, chloroborane lithium, lower aliphatic carboxylate lithium, lithium tetraphenylborate, or other ionizable salt. Furthermore, in order to form a solid electrolyte interface on an active material, the electrolyte salt may be any one selected from the group consisting of $NaClO_4$, $KClO_4$, $NaPF_6$, $KPF_6$, $NaBF_4$, $KBF_4$, $NaCF_3SO_3$, $KCF_3SO_3$, $NaAsF_6$, and $KAsF_6$ or an alkali metal salt including a mixture of two or more thereof.

The electrolyte solvent may include cyclic or acyclic amides, amides like acetamides, esters, linear carbonates, cyclic carbonates, or a mixture thereof. The ester may be any one selected from the group consisting of a sulforanecarboxylic acid ester, methyl acetate, ethyl acetate, propyl acetate, methyl propionate, ethyl propionate, Ɣ-butyrolactone, Ɣ-valerolactone, Ɣ-caprolactone, Lactone, and Ɣ-caprolactone, or a mixture of two or more thereof. Specific examples of the linear carbonate compound include any one selected from a group consisting of dimethyl carbonate (DMC), diethyl carbonate (DEC), dipropyl carbonate (DPC), ethyl methyl carbonate (EMC), methyl propyl carbonate (MPC), and ethyl propyl carbonate, or a mixture of two or more thereof. Specific examples of the cyclic carbonate include any one selected from a group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and a halide thereof, or a mixture of two or more thereof. These materials are merely examples, and other liquid electrolytes know in the art may be used.

The crosslinkable monomer may include a monomer having two or more functional groups or a mixture of a monomer having two or more functional groups and a polar monomer having one functional group. The monomer having two or more functional groups may be any one selected from the group consisting of trimethylolpropane ethoxylate triacrylate, polyethylene glycol dimethacrylate, polyethyleneglycol diacrylate, divinylbenzene, polyester dimethacrylate, divinylether, trimethylolpropane, trimethylolpropane trimethacrylate, and ethoxylated bisphenol A dimethacrylate, or a mixture of two or more thereof. The polar monomer having one functional group may be any one selected from the group consisting of methylmethacrylate, ethylmethacrylate, butylmethacrylate, methylacrylate, butylacrylate, ethylene glycol methylether acrylate, ethylene glycol methylether methacrylate, acrylonitrile, vinylacetate, vinylchloride, and vinylfluoride, or a mixture of two or more thereof.

The thermal initiator for crosslinking or polymerizing the monomer by heating the same in order to form a gel or solid electrolyte-containing matrix may be selected from a group consisting of benzoyl peroxide, acetylperoxide, dilauryl peroxide, di-tert-butyl peroxide, t-butyl peroxy-2-ethylhexanoate, cumyl hydroperoxide, organic peroxides, such as hydrogen peroxide, and Azo compounds, such as 2,2'-azobis (2-cyanobutane), 2,2'-azobis(methylbutyronitrile) AIBN(2, 2'-Azobis(iso-butyronitrile)), and AMVN (2,2'-Azobisdimethyl-Valeronitrile), but is not limited thereto.

The thermal initiator may be contained at an amount of from 0.01 weight % to 5 weight % with respect to the total weight of an entire liquid pre-electrolyte composition. When the amount of the thermal initiator exceeds 5 weight %, gelation may occur too early or the unreacted polymerization initiator may remain during injection of the liquid pre-electrolyte into an electrode, thereby adversely affecting battery performance later. On the contrary, when the amount of the polymerization initiator is less than 0.01 weight %, gelation or solidification does not occur satisfactorily.

The liquid pre-electrolyte 130P exists not only inside the porous electrodes 110 and 120 based on the metal fiber-like current collectors 111 and 121, but also outside the porous electrodes 110 and 120. In this case, the liquid pre-electrolyte 130P may completely cover the metal fiber-like current collectors 111 and 121 and the active materials 112 and 122 existing in the electrodes 110 and 120.

In the gelating or solidifying operation S13, a polymer electrolyte 130 is formed as the liquid pre-electrolyte is gelated or solidified by a thermal polymerization initiator and/or a crosslinking initiator as heat is applied thereto from the outside of the electrodes 110 and 120. The gelating or solidifying operation S13 may be performed at a temperature of from 30° C. to 100° C. When a heating temperature is less than 30° C., the liquid pre-electrolyte 130P is not gelated or solidified. On the contrary, when a heating temperature is higher than 100° C., the liquid pre-electrolyte 130P may be volatilized or thermally damaged. The gelated or solidified polymer electrolyte 130 may be formed directly on the electrodes 110 and 120 through hot air, induction coil heating, infrared ray irradiation, or a hot plate. However, the present invention is not limited thereto.

In the gelating or solidifying operation S13, the metal fiber-like current collectors 111 and 121 may constitute a heat conduction network based on high thermal conductivity of the metal fibers in an electrode. Since the heat conduction network including the metal fiber-like current collectors 111 and 121 having high thermal conductivity substantially occupies the entire volume of the electrodes 110 and 120, the electrodes 110 and 120 are substantially free of temperature variations throughout the entire volume when the electrodes 110 and the 120 are heated. Therefore, in the gelating or solidifying operation S13, a monomer is uniformly crosslinked and polymerized throughout the entire electrodes 110 and 120 by a thermal initiator of the liquid pre-electrolyte 130P to gelate or solidify and an electrolyte salt dispersed in the electrolyte solvent is uniformly impregnated into the gelated or the solidified polymer electrolyte 130.

Furthermore, in the gelating or solidifying operation S13, the high thermal conductivity of the metal fiber-like current collectors 111 and 121 may provide more calories per unit time even when there is no significant difference between temperatures inside and outside the electrodes 110 and 120, and thus a heating temperature may be maintained in a low temperature range as described above. As a result, according to an embodiment of the present invention, it is possible to prevent the polymer electrolyte formed by volatilization of the liquid pre-electrolyte 130P in the gelating or solidifying operation S13 from having a composition ratio different from a designed composition ratio or being thermally damaged, and gelation or solidification of the liquid pre-electrolyte 130P may be achieved more quickly under a same temperature.

According to some embodiments, the gelating or solidifying operation S13 may be performed in a vacuum state. In this case, the wettability of the liquid pre-electrolyte 130P may be further improved and, as a result, the contact resistance between the polymer electrolyte 130 and the electrodes 110 and 120 may be further reduced and the internal resistance of the battery may be reduced. A separate vacuum chamber may be required in order to perform the gelating or solidifying operation S13 in a vacuum state as described above.

According to some embodiments, after the gelating or solidifying operation S13 regarding the polymer electrolyte 130, the electrodes 110 and 120 integrated with the polymer electrolyte 130 may be pressed at a certain pressure to reduce thicknesses of the electrodes 110 and 120 and further improve the wettability of the polymer electrolyte 130. Selectively, gelation or solidification of the liquid pre-electrolyte 130P may be completed by performing a quenching operation after the gelating or solidifying operation S13.

Subsequently, in the stacking or winding operation S14, an electrode assembly 100A may be provided by alternately stacking the positive electrode 110 and the negative electrode 120 fabricated as described above or winding the same for a plurality of number of times. In this case, a separator disposed between the positive electrode 110 and the negative electrode 120 may be omitted since the surfaces of the electrodes 110 and 120 are completely surrounded by the gelated or solidified polymer electrolyte 130. However, it is obvious that, in some cases, an additional porous separator may be provided between the positive electrode 110 and the negative electrode 120 to ensure complete insulation.

According to another embodiment, after the stacking or winding operation S14 for forming an electrode assembly by stacking or winding a separator around the positive electrode 110, around negative electrode 120, and between positive electrode 110 and negative electrode 120, the liquid pre-electrolyte 130P may be introduced into the electrode assembly (operation S12), and then the gelating or solidifying operation S13 may be performed on the electrode assembly.

In the sealing operation S15, the above-described stacked or wound electrode assembly 100A is put in a casing 140, such as a pouch, and the casing 140 is sealed. A positive electrode lead tab 113 may be attached to the positive electrode 110 in advance, whereas a negative electrode lead tab 123 may be attached to the negative electrode 120 in advance. The positive electrode lead tab 113 and the negative electrode lead tab 123 are arranged to be exposed or protrude out of the outer surface of the casing 140.

In the above-described embodiment, the same process is applied to both the positive electrode 110 and the negative electrode 120 as shown in FIG. 1A, but the present invention is not limited thereto. For example, the fabricating method shown in FIG. 1A may be applied to only one of the positive electrode 110 and the negative electrode 120.

According to the above-described embodiments, no liquid electrolyte is present inside the casing member 140 by using the polymer electrolyte 130 obtained by gelating or solidifying a liquid pre-electrolyte, the electrolyte 130 does not leak out of the casing 140, and thus safety may be secured. Furthermore, in case of a flexible battery, shape of the flexible battery may be frequently deformed due to an external force. In this case, according to an embodiment of the present invention, since the metal fiber-like current collectors 111 and 121 inside electrodes may maintain contact with an active material even when the entire electrodes are deformed, a reliable flexible battery may be implemented.

Furthermore, as compared to a conventional liquid electrolyte, the gelated or solidified electrolyte together with the metal fiber-like current collectors 111 and 121 may provide greater external pressure, such that contact between the metal fiber-like current collector 111 and 121 and an active material may be maintained. Therefore, lifespan of a flexible battery may be maintained despite deformation of the flexible battery. Furthermore, flexibility of an electrode makes it possible to manufacture a battery pack in various sizes and shapes according to the purpose of the battery pack. Therefore, when a battery pack is manufactured by using conventional cylindrical and prismatic batteries, formation of a dead volume irrelevant to capacity of batteries between the batteries may be prevented, thereby providing a secondary battery having a high energy density.

Figure 2A:
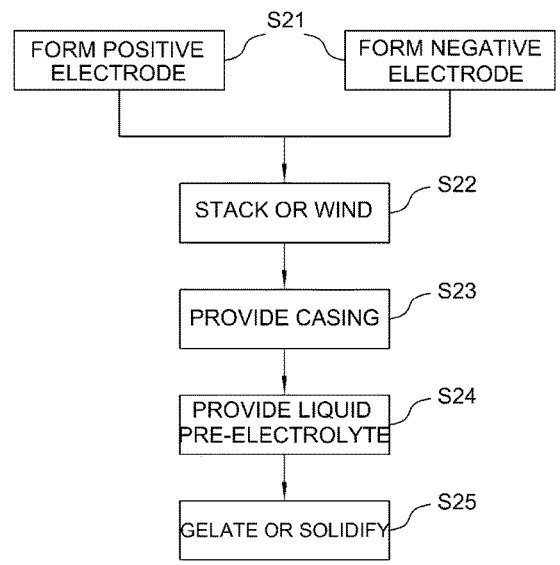
FIGS. 2A and 2B are a flowchart and a schematic diagram showing a method of manufacturing a secondary battery according to another embodiment of the present invention.
Figure 2B:
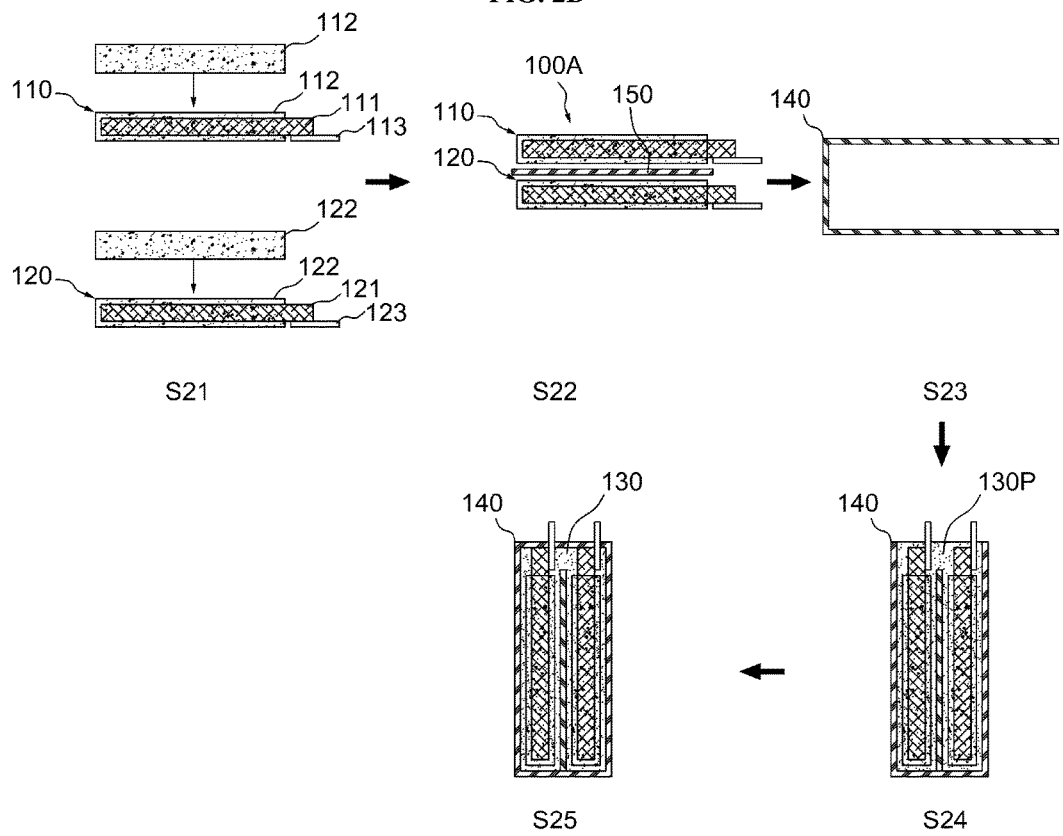

FIGS. 2A and 2B are a flowchart and a schematic diagram showing a method of manufacturing a secondary battery according to another embodiment of the present invention.

As shown in FIGS. 2A and 2B, a method of manufacturing a secondary battery according to an embodiment of the present invention includes an electrode forming operation S21, a stacking or winding operation S22, a casing providing operation S23, a polymer precursor providing operation S24, and a gelating or solidifying operation S25. Since the present embodiments are similar to the above-described embodiments, descriptions below will focus on differences.

As described above with reference to FIGS. 1A and 1B, in the stacking or winding operation S22, with respect to the positive electrode 110 and the negative electrode 120, which are prepared in the electrode forming operation S21, a porous separator 150 is interposed between the positive electrode 110 and the negative electrode 120, and the positive electrode 110, the negative electrode 120, and the porous separator 150 are stacked or wound to form the electrode assembly 100A. Although a porous separator may be omitted in the embodiment disclosed with reference to FIGS. 1A and 1B, in the embodiment of FIGS. 2A and 2B, the positive electrode 110 and the negative electrode 120 are not yet surrounded by the polymer electrolyte 130. Therefore, when the electrode assembly 100A is formed by stacking or winding the positive electrode 110 and the negative electrode 120 without the porous separator 150, the positive electrode 110 and the negative electrode 120 may be short-circuited to each other.

The separator 150 is preferably made of a porous material having a large number of spaces to be filled with an electrolyte solution for easy transfer of ions. For example, the separator 150 may be formed of any one selected from a group consisting of polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalene, polyvinylidene fluoride, polyethylene oxide, polyacrylonitrile, polyvinylidene fluoride hexafluoropropylene copolymer, polyethylene, polypropylene, and equivalents thereof, or a combination thereof. The listed materials are merely examples, and the present invention is not limited thereto. For example, a polyolefin-based material may also be used as the separator 150.

According to an embodiment, the separator 150 may be in the form of a fiber or a membrane. The fibrous separator may include a nonwoven fabric forming a porous web and may be a spunbond or meltblown consisting of long fibers. Pore size and porosity of the separator 150 are not particularly limited. However, the porosity may be 30% to 95%, and an average pore diameter may be in the range from 0.01 µm to 10 µm. When the pore size and the porosity are less than 0.01 µm and about 30%, respectively, it is difficult to sufficiently impregnate an electrolyte due to a decrease in movement of a liquid electrolyte precursor. When the pore size and porosity are greater than about 10 µm and 95%, respectively, it is difficult to maintain the mechanical properties and it is highly likely that the positive electrode 110 and the negative electrode 120 are short-circuited internally.

The thickness of the separator 150 is not particularly limited, but may be in the range from 1 μm to 100 μm and may preferably be in the range from 5 μm to 50 μm. When the thickness of the separator 150 is less than 1 μm, it is difficult to maintain the mechanical properties. When the thickness of the separator 150 exceeds 100 μm, the separator 150 functions as a resistive layer and lowers an output voltage.

In the casing providing operation S23, for example, a pouch casing 140 may be provided. The pouch casing 140 may include a stacked structure having an insulating layer on both sides of an inner metal foil as a center. Furthermore, the pouch casing 140 is provided in the form of an envelope, thereby accommodating the above-described electrode assembly 100A and a liquid pre-electrolyte together.

In the liquid pre-electrolyte providing operation S24, the electrode assembly 100A is placed in the casing 140, and the liquid pre-electrolyte 130P containing a polymer, an organic solvent, a lithium salt, and a thermal crosslinking initiator is put into the casing 140, as described above. One side of the casing 140 is opened to the outside, such that various gases are easily discharged to the outside during gelation or solidification of the polymer electrolyte 130.

In the gelating or solidifying operation S25, heat is applied to the casing 140 containing the electrode assembly 100A and the liquid pre-electrolyte 130P in order to form the electrodes 110 and 120, the separator 150, and the liquid pre-electrolyte 130P are gelated or solidified while being integrated with other components. According to an embodiment, the gelating or solidifying operation S25 may be performed at a temperature from 30° C. to 100° C. as described above.

In the gelating or solidifying operation S25, the metal fiber-like current collectors 111 and 121 provide not only an electrical network, but also a thermal network. As a result, thermal conductive paths are formed throughout the electrodes 110 and 120, and thus the liquid pre-electrolyte 130P is uniformly gelated or solidified throughout the electrodes 110 and 120. The liquid pre-electrolyte 130P existing in the pores of the separator 150 is also gelated or solidified, and thus the electrodes 110 and 120 and the separator 150 may be integrated with each other by the polymer electrolyte 130. As a result, flexibility and pliability of the secondary battery may be doubled.

According to an embodiment, the gelating or solidifying operation S25 may be performed in a vacuum state and, in a subsequent process, the casing 140 accommodating the electrodes 110 and 120 integrated with the gelated or solidified polymer electrolyte 130 is pressed. As a result, the thickness of a battery may be reduced and the wettability of the polymer electrolyte 130 may be further improved. After the gelating or solidifying operation S25, the gelation or solidification of the above-described polymer electrolyte 130 may be completed by performing a quenching operation.

After the gelating or solidifying operation S25, a casing sealing operation may be performed. In the casing sealing operation, an open area of the casing 140 is completely sealed by using a heat fusion method or an adhesive. In this case, as described above, the positive electrode lead tab 113 and the negative electrode lead tab 123 respectively connected to the positive electrode 110 and the negative electrode 120 are arranged to be exposed or protruded out of the casing 140.

In the above-described embodiment, the structure in which both the positive electrode 110 and the negative electrode 120 include metal fiber-like current collectors is described. However, it is merely an example, and only one selected from between the positive electrode 110 and the negative electrode 120 (e.g., the negative electrode 120 only) may include a metal-fiber shaped current collector.

Figure 3A:
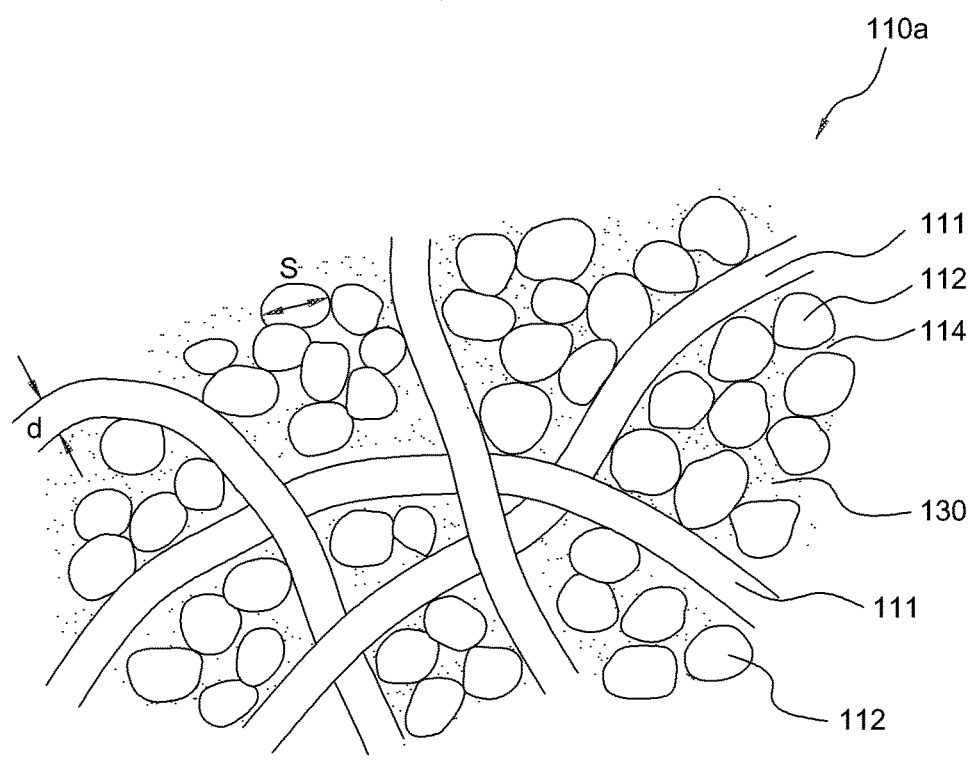
FIGS. 3A through 3C are cross-sectional diagrams showing the structure of an electrode in a secondary battery according to the present invention.
Figure 3B:
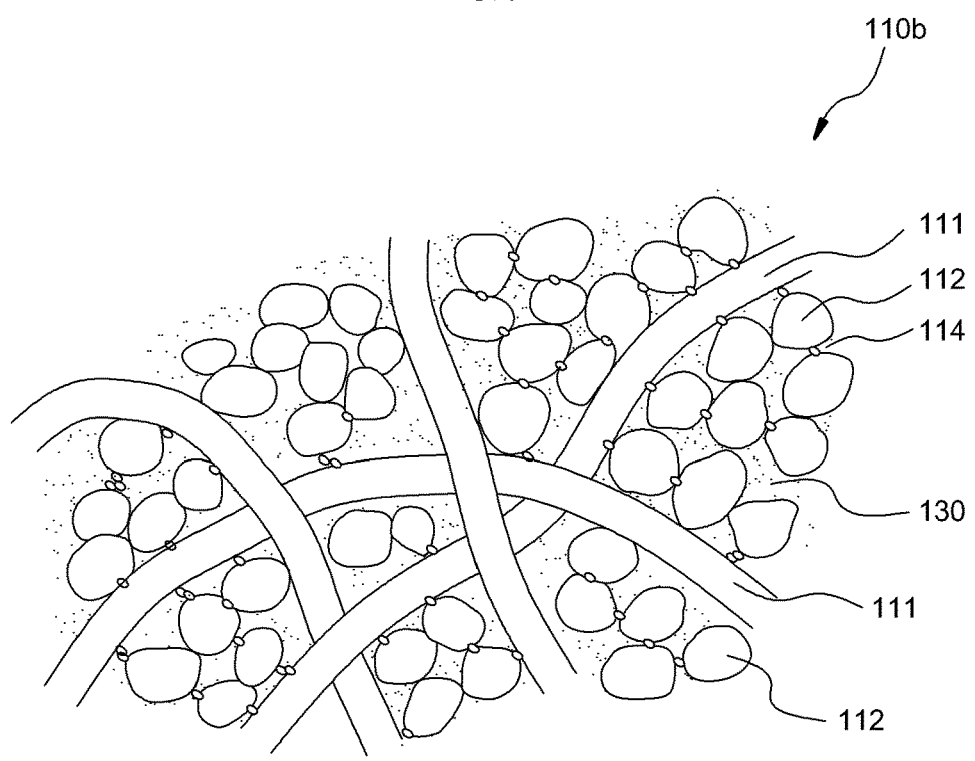
Figure 3C:
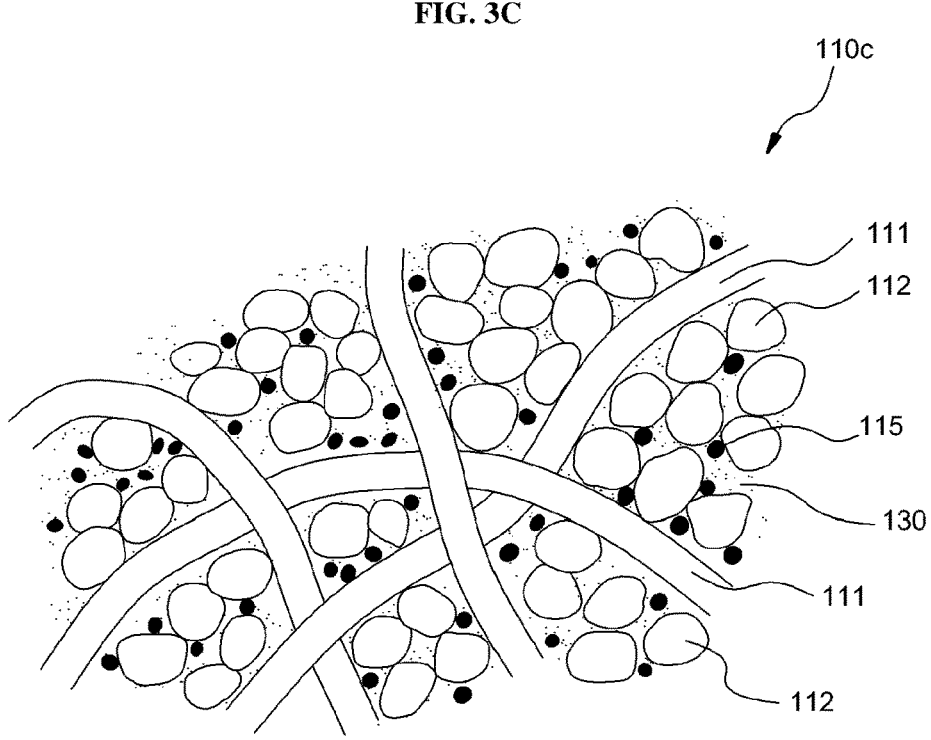

FIGS. 3A through 3C are cross-sectional diagrams showing the structure of an electrode in a secondary battery according to the present invention. Here, electrodes 110a, 110b, and 110c will be described as positive electrodes.

Referring to FIG. 3A, the electrode 110a includes the metal fiber current collectors 111 and a particle-type active material 112, where the gelated or solidified polymer electrolyte 130 is provided there between. As shown in FIG. 3A, the metal fiber-like current collectors 111 include a substantially straight-linear shape and a bent shape. However, according to another embodiment of the present invention, the metal fiber-like current collectors 111 may be formed to have other regular and/or irregular shapes, such as a curled shape and a spiral shape.

The metal fiber-like current collectors 111 having a straight-linear shape, a bent shape, or other regular and/or irregular shapes as described above forms a heat conduction network having high heat conductivity unique to metals by physically contacting one another. Since the heat conduction network is formed as the one or more metal fiber-like current collectors 111 are curved and bent and are tangled, contact, or combined with one another, the heat conduction network is mechanically durable despite of pores therein and may be flexible due to fibrous characteristics.

The particle-type active material 112 is confined in the heat conduction network provided by the metal fiber type current collectors 111, where size and the porosity of the pores in the conductive network constituting the metal fiber type current collectors 111 may be appropriately controlled, such that the active material 112 is strongly bound to the heat conduction network. The size and the porosity of the pores may be controlled by controlling the weight ratio of a mixture of the metal fiber type current collectors 111 the active material 112 in the entire electrode 110a.

The gelated or solidified polymer electrolyte 130 is strongly bound to the pores provided between the metal fiber current collectors 111 and the active material 112 and contacts the entire interface of the particle-type active material 112. Therefore, the polymer electrolyte 130 exhibits improved wettability/contact with the active material 112, thereby reducing the contact resistance between the polymer electrolyte 130 and the active material 112 and improving electrical conductivity of these.

As shown in FIG. 3B, a binder 114 may be further added to the electrode 110b, such that the particle-type active material 112 is strongly bound to a heat conduction network. The binder 114 may be a polymer material, e.g., vinylidene fluoride-hexafluoropropylene copolymer (PVdF-co-HFP), polyvinylidenefluoride (PVdF), polyacrylonitrile, polymethylmethacrylate, polytetrafluoroethylene (PTFE), styrenebutadiene rubber (SBR), polyimide, polyurethane polymer, polyester polymer, and ethylene-propylene-diene copolymer (EPDM). However, the present invention is not limited to those examples, and any material that is not dissolved in the electrolyte 130 has a predetermined binding force and stability under an electrochemical environment may be used.

As shown in FIG. 3C, a conductive material 115 may be further added to the electrode 110c to improve electrical conductivity. The conductive material 115 may be carbon black, acetylene black, Ketjen black, fine carbon like ultrafine graphite particles, a nano metal particle paste, or a nano structure having a large specific surface area and a low resistance (e.g., indium tin oxide (ITO) paste or carbon nanotube. In the electrode 110c according to the present embodiment, since the metal fiber-like current collectors 111 having a fine size corresponding to the active material 112 may perform the same role as the conductive material 115, an increase in the manufacturing cost due to the addition of the conductive material 115 may be suppressed.

According to another embodiment, although not shown, porous ceramic particles may be further added to the electrodes 110a, 110b, and 110c described above. The porous ceramic particles may include, for example, porous silica. The porous ceramic particles facilitate the impregnation of the polymer electrolyte 130 into the electrodes 110a, 110b, and 110c.

Figure 4:
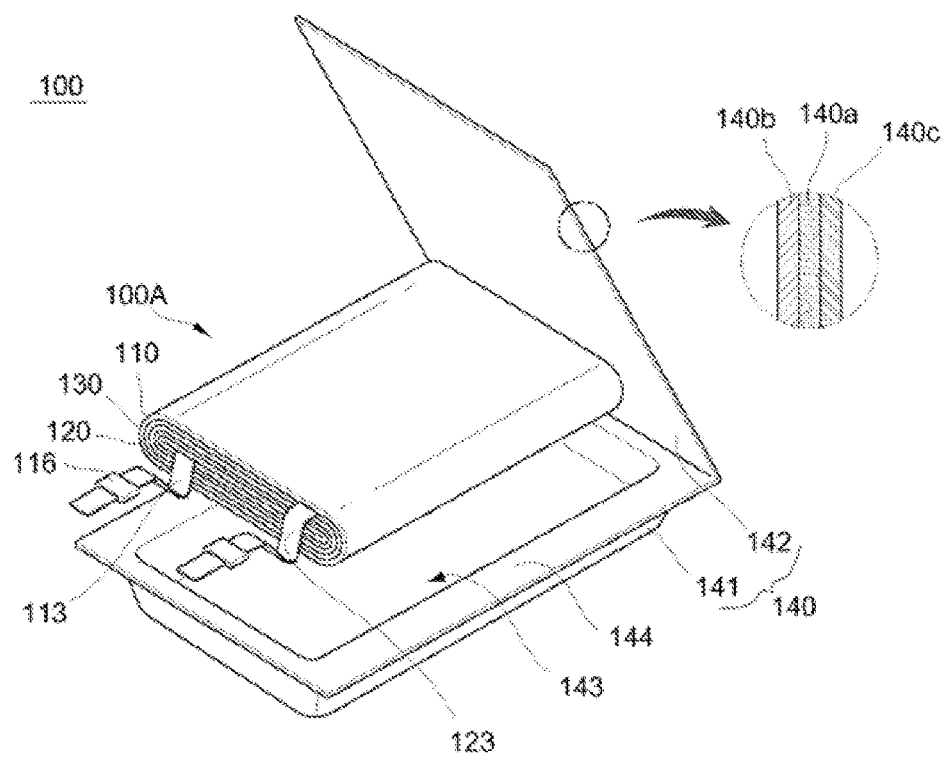
FIG. 4 is an exploded perspective view of a secondary battery according to an embodiment of the present invention.

FIG. 4 is an exploded perspective view of a secondary battery 100 according to an embodiment of the present invention.

Referring to FIG. 4, the secondary battery 100 includes the electrode assembly 100A having the gelated or solidified polymer electrolyte 130 and the battery casing 140 surrounding the electrode assembly 100A. The electrode assembly 100A may be provided as a jellyroll-type formed by winding the positive electrode 110, the negative electrode 120, and the polymer electrolyte 130 interposed there between. Alternatively, the plate-like stacked electrode assembly 100A in which the positive electrode 110 and the negative electrode 120 are stacked may be provided. Furthermore, a porous separator may be interposed between the positive electrode 110 and the negative electrode 120 in addition to the polymer electrolyte 130.

The positive electrode lead tab 113 and the negative electrode lead tab 113 are respectively and electro-conductively attached to the positive electrode 110 and the negative electrode 120 of the electrode assembly 100A via a welding, such as laser welding, ultrasonic welding, and resistance welding, or via a conductive adhesive. Those lead tabs 113 and 123 are formed to protrude from the electrode assembly 100A in a direction perpendicular to the direction in which the electrode assembly 100A is wound.

The battery casing 140 includes a casing main body 141 having a space 143 in which the electrode assembly 100A may be accommodated and a casing cover 142 having at least one side contacting the casing main body 141. A sealing portion 144 for connecting with a casing cover 142 is formed along the three sides of the casing main body 141 excluding the one side integrally contacting the casing cover 142.

The battery casing 140 may be formed by stacking, for example, a first insulation layer 140b/a metal layer 140a/a second insulation layer 140c, where, in order to implement a flexible secondary battery, a material and a structure with high durability against deformation may be selected. According to an embodiment, when the sealing portion 144 are thermally fused while the casing main body 141 and the casing cover 142 are closely contacting each other, the second insulating layers 140c of the sealing portions 144 that are in contact with one another are adhered to one another, and thus the battery casing 140 is sealed.

The positive electrode lead tab 113 and the negative electrode lead tab 123 of the electrode assembly 100A may be withdrawn via the sealing portion 144 located at a side opposite to the side via which the casing main body 141 and the casing cover 142 are connected to each other. A protective tape 116 made of an insulating material may be attached to the lead tabs 113 and 123 to prevent short-circuit between the lead tabs 113 and 123.

According to an embodiment, although not shown, a protection circuit module may be electrically connected to the positive electrode lead tab 113 and the negative electrode lead tab 123, thereby preventing the secondary battery 100 from being overcharged and over-discharged and may prevent the secondary battery 100 from being in a dangerous state in case of a short circuit outside the secondary battery 100.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

According to an embodiment of the present invention, after a liquid pre-electrolyte made of a polymer, an electrolyte solvent, a crosslinkable monomer, and a lithium salt is provided on an electrode including a mixture of metal fiber-like current collectors, which constitute a conductive network, and an active material, a high temperature operation is performed. At this time, the metal fiber-like current collectors function as a heat conduction path. Therefore, a method of manufacturing a secondary battery including electrodes having a polymer electrolyte obtained as the liquid pre-electrolyte is rapidly and uniformly gelated or solidified throughout the electrodes may be provided.

DESCRIPTION OF REFERENCE NUMERALS

100; secondary battery
110; positive electrode
111; metal fiber-like current collector of positive electrode
112; active material of positive electrode
113; positive electrode lead tab
120; negative electrode
121; metal fiber-like current collector of negative electrode
122; active material of negative electrode
123; negative electrode lead tab
130P; liquid pre-electrolyte
130; polymer electrolyte

The invention claimed is:

1. A method of manufacturing a secondary battery, the method comprising:
   forming an electrode comprising a metal fiber non-woven current collector, in which a plurality of metal fibers are randomly arranged, physically contact with one another, and are tangled with one another by being bent or curved so that the plurality of metal fibers are mechanically connected to one another, and the plurality of metal fibers constitute a heat conduction network and an active material combined with the plurality of metal fibers; and
   providing a liquid pre-electrolyte that may be either thermally polymerized or crosslinked to the electrode and applying heat thereto so that the heat is transferred throughout the electrode through the heat conduction network, such that the liquid pre-electrolyte is integrated with the electrode and forms a gelated or solidified polymer electrolyte, wherein by a thermal conductivity of the plurality of metal fibers constituting the heat conduction network, temperature variations throughout an entire volume of the electrode decreases during the applying of the heat, and wherein the active material comprises active material particles which are confined in pores of the heat conduction network, and the gelated or solidified polymer electrolyte is bound to pores provided between the plurality of metal fibers and the active material particles.

2. The method of claim 1, wherein the liquid pre-electrolyte comprises an electrolyte salt, an electrolyte solvent, a crosslinkable monomer, and a thermal initiator that gelates or solidifies the monomer via at least one of crosslinking and polymerization by using heat.

3. The method of claim 2, wherein the crosslinkable monomer comprise a monomer having two or more functional groups or a mixture of a monomer having two or more functional groups and a polar monomer having one functional group.

4. The method of claim 3, wherein the monomer having two or more functional groups comprises any one selected from the group consisting of trimethylolpropane ethoxylate triacrylate, polyethylene glycol dimethacrylate, polyethyleneglycol diacrylate, divinylbenzene, polyester dimethacrylate, divinylether, trimethylolpropane, trimethylolpropane trimethacrylate, and ethoxylated bisphenol A dimethacrylate, or a mixture of two or more thereof.

5. The method of claim 3, wherein the polar monomer having one functional group comprises any one selected from the group consisting of methylmethacrylate, ethylmethacrylate, butylmethacrylate, methylacrylate, butylacrylate, ethylene glycol methylether acrylate, ethylene glycol methylether methacrylate, acrylonitrile, vinylacetate, vinylchloride, and vinylfluoride, or a mixture of two or more thereof.

6. The method of claim 2, wherein the electrolyte solvent comprises cyclic or acyclic amides, amides like acetamides, esters, linear carbonates, cyclic carbonates, or a mixture thereof.

7. The method of claim 2, wherein the thermal initiator comprises benzoyl peroxide, acetylperoxide, dilauryl peroxide, di-tert-butyl peroxide, t-butyl peroxy-2-ethyl-hexanoate, cumyl hydroperoxide, hydrogen peroxide, 2,2'-azobis (2-cyanobutane), 2,2'-azobis(methylbutyronitrile) AIBN(2,2'-Azobis(iso-butyronitrile)), or AMVN (2,2'-Azobisdimethyl-Valeronitrile).

8. The method of claim 1, wherein the gelating or solidifying is performed at a temperature of from 30° C. to 100° C.

9. The method of claim 1, further comprising pressing the electrode in which the polymer electrode is formed.

10. The method of claim 1, wherein the gelating or solidifying is performed by providing the liquid pre-electrolyte before the electrode is put into a casing.

11. The method of claim 1, wherein the gelating or solidifying is performed by providing the liquid pre-electrolyte after the electrode is put into a casing.

12. The method of claim 11, wherein the electrode is either a positive electrode or a negative electrode, and the positive electrode and the negative electrode are put into the casing after a separator is interposed between the positive electrode and the negative electrode.

13. The method of claim 1, wherein the active material and the liquid pre-electrolyte are mixed with each other and impregnated into the metal fiber-like current collector.

14. A secondary battery comprising an electrode assembly having a positive electrode and a negative electrode, wherein at least one of the positive electrode and the negative electrode comprises a current collector having a plurality of metal fibers of non-woven structure, an active material combined with the plurality of metal fibers, and a gelated or solidified polymer electrolyte integrated with the plurality of metal fibers, wherein the plurality of metal fibers are randomly arranged, physically contact with one another, and are tangled with one another by being bent or curved to be mechanically connected to one another so that the plurality of metal fibers constitute a heat conduction network and heat is transferred via the heat conduction network and temperature variations throughout the entire volume of the electrode decreases to form the gelated or solidified polymer electrolyte integrated with the plurality of metal fibers, and wherein the active material comprises active material particles which are confined in pores of the heat conduction network, and the gelated or solidified polymer electrolyte is bound to pores provided between the plurality of metal fibers and the active material particles.

15. The secondary battery of claim 14, wherein the polymer electrolyte is integrated with both the positive electrode and the negative electrode.

16. The secondary battery of claim 14, wherein the polymer electrolyte comprises a matrix formed as a monomer having two or more functional groups or a mixture of a monomer having two or more functional groups and a polar monomer having one functional group is polymerized via at least one of crosslinking or polymerization, an electrolyte salt, and an electrolyte solvent.

17. The secondary battery of claim 14, wherein, since at least a portion of the polymer electrolyte surrounds surfaces of a corresponding electrode, a separator is omitted between the positive electrode and the negative electrode.

18. The secondary battery of claim 14, wherein the metal fiber-like current collector has a non-woven fabric-like structure.

* * * * *